United States Patent
Lipps et al.

[11] Patent Number: 5,860,861
[45] Date of Patent: Jan. 19, 1999

[54] RIDING BOARD GAME CONTROLLER

[75] Inventors: John D. Lipps, 2075 Case Pkwy. South, Twinsburg, Ohio 44087; Stephen J. Szczecinski, Stow; Gregory J. Svetina, Streetsboro, both of Ohio

[73] Assignee: John D. Lipps, Kent, Ohio

[21] Appl. No.: 799,453

[22] Filed: Feb. 13, 1997

Related U.S. Application Data

[63] Continuation-in-part of Ser. No. 436,983, May 8, 1995, abandoned.

[51] Int. Cl.$^6$ .................................................. A63F 9/22
[52] U.S. Cl. .................................. 463/36; 273/148 B
[58] Field of Search .................................. 463/36, 37, 38, 463/39; 273/148 B; 434/253, 247; 482/902, 901, 1, 71, 70

[56] References Cited

U.S. PATENT DOCUMENTS

| | | | |
|---|---|---|---|
| 3,863,915 | 2/1975 | Pifer | 272/57 B |
| 4,488,017 | 12/1984 | Lee | 200/5 R |
| 4,660,828 | 4/1987 | Weiss | 272/138 |
| 4,817,950 | 4/1989 | Goo | 273/148 |
| 4,906,192 | 3/1990 | Smithard et al. | 434/253 |
| 4,925,189 | 5/1990 | Braeuing | 273/148 |
| 5,049,079 | 9/1991 | Furtado et al. | 434/253 |
| 5,054,771 | 10/1991 | Mansfield | 272/73 |
| 5,139,261 | 8/1992 | Openiano | 273/148 |
| 5,148,152 | 9/1992 | Stueckle et al. | 340/706 |
| 5,195,746 | 3/1993 | Boyd et al. | 273/148 |
| 5,229,756 | 7/1993 | Kosugi et al. | 340/706 |
| 5,252,068 | 10/1993 | Gryder | 434/30 |
| 5,362,069 | 11/1994 | Hall-Tipping | 273/438 |
| 5,364,271 | 11/1994 | Aknin et al. | 434/61 |
| 5,405,152 | 4/1995 | Katanics et al. | 273/438 |
| 5,409,226 | 4/1995 | Mesko et al. | 273/148 |

*Primary Examiner*—Michael O'Neill
*Attorney, Agent, or Firm*—Thompson Hine & Flory LLP

[57] ABSTRACT

A riding board game controller for sending directional and non-directional control signals to an audio-visual game having a microprocessor-based host computer for sending audio-visual signals to a display device, the riding board game controller comprising: a substantially rectangular platform, pivotally supported along its central longitudinal axis on a playing surface and adapted to support an operator standing thereon, such that side-to-side pivoting of the platform can be performed by the operator; a biasing system, positioned between the platform and the playing surface, for biasing the platform away from the playing surface; a left dual-state switch, positioned between the platform and the playing surface, on the left side of the longitudinal axis, and activated by a pivoting of the platform to the left side; a right dual-state switch, positioned between the platform and the playing surface, on the right side of the longitudinal axis, and activated by a pivoting of the platform to the right side; a center dual-state switch, positioned between the platform and the playing surface, substantially along or near the longitudinal axis, and activated by a movement of the longitudinal axis towards or away from the playing surface; and a signal processor for converting signals from the left and right switches into directional control signals, for converting a signal from the center switch into a non-directional signal, and for sending the directional and non-directional control signals to the host computer.

12 Claims, 9 Drawing Sheets

RIDING BOARD GAME CONTROLLER

CROSS REFERENCE TO RELATED APPLICATIONS

The application is a continuation-in-part of U.S. application, Ser. No. 08/436,983, filed May 8, 1995 now abandoned.

BACKGROUND

The present invention relates to computer peripheral devices and, more particularly, to controllers for computers, games and computer game devices.

Typical computer games and video games generally include an audio-visual display device (e.g., a television monitor), a computer host or video game unit which transmits the simulation video and audio signals to the display device, a port for receiving a video game software or data, and at least one hand manipulated control device with which the game operator interacts with the video game. Such hand manipulated control devices exist in many forms such as a hand-held control pad, a keyboard, a joystick, a mouse, a trackball, and the like. Typically, hand manipulated control devices have directional controls for moving a character in the game and auxiliary controls for other activities such as causing the character to perform a certain act, such as jumping.

One type of hand-held control pad, for example, has four directional control push-buttons and a number of non-directional push-buttons. The push-buttons are dual state (on/off) buttons. Each directional button, when pressed by the operator, causes a corresponding directional action of the character in the video game such as turning the character to the right or left. Auxiliary push buttons, when pressed, cause non-directional actions such as jumping, punching, ducking, shooting, etc. oftentimes, a directional, and an auxiliary push-button can be used in combination to effect a certain action in a certain direction, such as causing the image to punch right or left, or moving the image to the right or left with greater speed.

Many computer games and video games are based on the theme of skate boarding, snow boarding, or surfing. Generally, these games require the player to control the riding board action through such hand-manipulated controls. The game would be more enjoyable and the simulation more realistic if the hand-manipulated control device could be replaced by a control device that requires the actual body movement and coordination of an operator riding a skate board, a snow board, or a surf board.

U.S. Pat. No. 4,817,950 to Goo discloses a video game having a control unit in which the operator simulates riding a surf board. The game control unit of Goo is a surf board which is supported by a hemispherical fulcrum member and an inflatable annular tube which encircles the fulcrum for biasing the surf board to a substantially horizontal position over the fulcrum. The fulcrum encloses a gravity switch which makes electrical contact when the player pivots the surf board, and fulcrum, in certain directions. Consequently, while Goo discloses a video game control unit for simulating a surf board, the control unit has several disadvantages. The control unit is bulky and cannot be configured to substitute as a conventional hand-held control pad or keyboard. Further, the device provides directional signals only and thus is unable to send non-directional signals to the video game computer; and is unable to detect the magnitude of a directional pivot of the surf board, which would signal the image to execute a regular turn versus a sharp turn.

U.S. Pat. No. 4,906,192 to Smithard et al. discloses a skiing or snow-surfing simulator device. The device includes a control unit, which the player stands upon, a data processing means, and a visual display unit. In one embodiment of the control unit for the device (see FIG. 10), a pair of skis are coupled above a base unit with springs or compliant pads such that they pivot or move thereover. Analog linear movement sensors are mounted to the base, between the skis and the base, to detect movement by the skis and to produce signals indicative thereof. The signals are processed by the data processing means and transmitted to the visual display unit to display a simulated trajectory or track that is visible to the person standing on (playing) the control unit. A disadvantage of the Smithard et al. controller is that it requires complicated analog sensors and data processing means to process the analog signals generated by the sensors. Furthermore, the Smithard et al. controller is not adapted to replace a hand-manipulated controller required by conventional video-game devices; and thus, does not disclose any solution for inexpensively and easily converting movement of the player into directional and non-directional signals required by such video-game devices.

Finally, neither Goo nor Smithard et al. provide for connection of one of the hand-manipulated controllers thereto; and therefore, are not equipped to allow for additional features of play provided by an additional hand-manipulated controller.

SUMMARY OF THE INVENTION

The present invention is a riding board game controller for controlling a computer game or a conventional video-game device. The invention is configured to substitute a conventional hand-manipulated control device with riding board, which is stood upon by a player and pivots in response to a player's weight shift and generates signals to the game computer to cause the computer game image to execute normal left and right turns, sharp left and right turns, as well as speeding up and jump commands. In a preferred embodiment, the controller includes a port for connecting from a conventional hand-manipulated controller thereto, to allow the hand-manipulated controller to be manipulated to send commands to the computer, such as starting the game, scrolling menus and the like.

In accordance with the present invention a riding board game controller is provided for use with an audio-visual game having an audio-visual display device such as a television monitor, a host computer having a transmitter for sending audio-visual display signals to the display device, a receptacle for receiving control signals from a game controller, and a software program running on the computer and generating audio-visual signals in response to the control signals.

The riding board controller comprises: a substantially rectangular platform pivotally supported along its longitudinal axis upon a playing surface and adapted to support an operator standing thereon; a biasing system, positioned between the platform and the playing surface, for biasing the platform away from the playing surface, and for biasing the platform to a flat planar orientation with respect to the playing surface; a left dual-state switch, for generating a left on/off signal, positioned between the platform and the playing surface, on the left side of the platform's longitudinal axis, and being activated by a pivoting of the platform to the left side; a right dual-state switch, for generating a right on/off signal, positioned between the platform and the playing surface, on the right side of the platform's longitudinal axis, and being activated by a pivoting of the platform to the right side; a central dual-state switch, for generating a central on/off signal, positioned between the platform and the playing surface, substantially along the platform's longitudinal axis, the central switch being activated by a movement of the longitudinal center of the platform towards or away from the playing surface; and a signal processor for converting the left and right on/off signals into directional signals, for converting the central on/off signal into a non-directional on/off signal, and for sending the directional and non-directional signals to the host computer.

Preferably, the system includes a means to combine the directional and non-directional control signals from the riding board controller with the directional and non-directional control signals from a hand-manipulated controller, and in turn, transmit the resultant directional and non-directional control signals to the host computer. In one embodiment, the riding board controller includes a receptacle for receiving signals from the hand-manipulated controller, and a pass-through circuit for transferring control signals from the hand-manipulated controller to the host computer.

In one embodiment of the invention, the riding board controller includes: a slightly curved or beveled bottom surface, which acts as a fulcrum and is adapted to abut the playing surface when a sufficient weight is applied to the top surface of the platform to overcome the biasing system, such that the platform is able to pivot side-to-side about the fulcrum when a player is standing thereon; biasing elements, such as springs, resilient foam, etc., mounted to the bottom surface of the platform and adapted to bias the platform away from the playing surface and to bias the platform to be substantially flat with respect to the playing surface; a left dual-state switch mounted to the left side of the platform's bottom surface; a right dual-state switch mounted to the right side of the platform's bottom surface; and a central switch mounted to the longitudinal centerline of the platform's bottom surface. Therefore, when the operator executes a slight right pivot, both the central and right switches are activated; when the operator executes a slight left pivot, both the central and left switches are activated; when the operator executes a hard right pivot, only the right switch is activated; when the operator executes a hard left pivot, only the left switch is activated; and when the operator jumps from the platform, none of the switches are activated.

In another embodiment of the invention, the controller includes: a base and a platform pivotally supported on the base and adapted to support an operator standing upon it such that the operator can pivot the platform and change the spatial orientation of the platform by shifting his or her weight. The platform is pivotally supported above the base by a pair of supports, which act as a fulcrum, allowing the platform to pivot about its central longitudinal axis above the base. A plurality of sensors, such as on/off switches, activated upon contact with the riding board, are positioned between the platform and the base. First and second pairs of the switches are positioned on either side of the axis, and the switches of the second pair are closer to the axis than the switches of the first pair. The two switches of the first pair, which are positioned furthest to the longitudinal axis, are activated by slight pivots of the riding board about the axis, while the switches closer to the longitudinal axis are activated by pivots of the riding board of great magnitude. An additional switch is provided along the axis beneath the front end of the riding board and is activated by the front end of the riding board pitching downward and upward. The pairs of switches are connected to the signal processor such that the outer switches signal normal right and left turns and the inner pair of switches signal sharp right and left turns. The forward switch signals forward speed when the board pitches down (switch "on") or jump when the board pitches up (switch "off").

Accordingly, it is an object of the present invention to provide a riding board controller in which the user simulates the actual motions made by a computer generated image by shifting his or her weight upon the board; it is an object to provide a controller that can be substituted for a conventional hand-manipulated controller in a conventional video game system or simulator system; it is an object to provide a controller that is capable of providing directional as well as non-directional dual-state signals; and it is an object to provide a controller that is relatively inexpensive and simple to manufacture, and that is also rugged in construction.

Other objects and advantages of the present invention will be apparent from the following description, the accompanying drawings and the appended claims.

DETAILED DESCRIPTION

Figure 1:
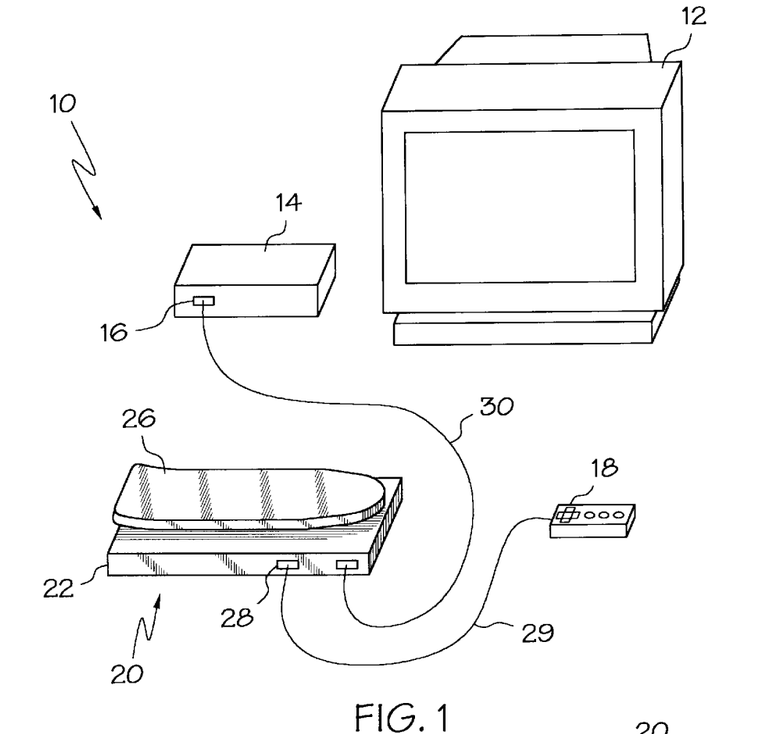
FIG. 1 is a perspective view of a first embodiment of the present invention, shown connected to a conventional video game system.

As shown in FIG. 1, a first embodiment of the riding board game controller of the present invention, generally designated 20, is shown connected to a conventional video game system 10 that includes a monitor 12 and a host computer 14. The host computer 14 generates audio-visual signals and transmits them to the monitor 12. The host computer 14 has a receptacle on a control port 16 for receiving control signals from a conventional hand-held game controller 18 or the riding board controller 20. The riding board controller 20, as shown in FIG. 1, is interconnected between the host computer 14 and the hand-held controller 18.

Figure 2:
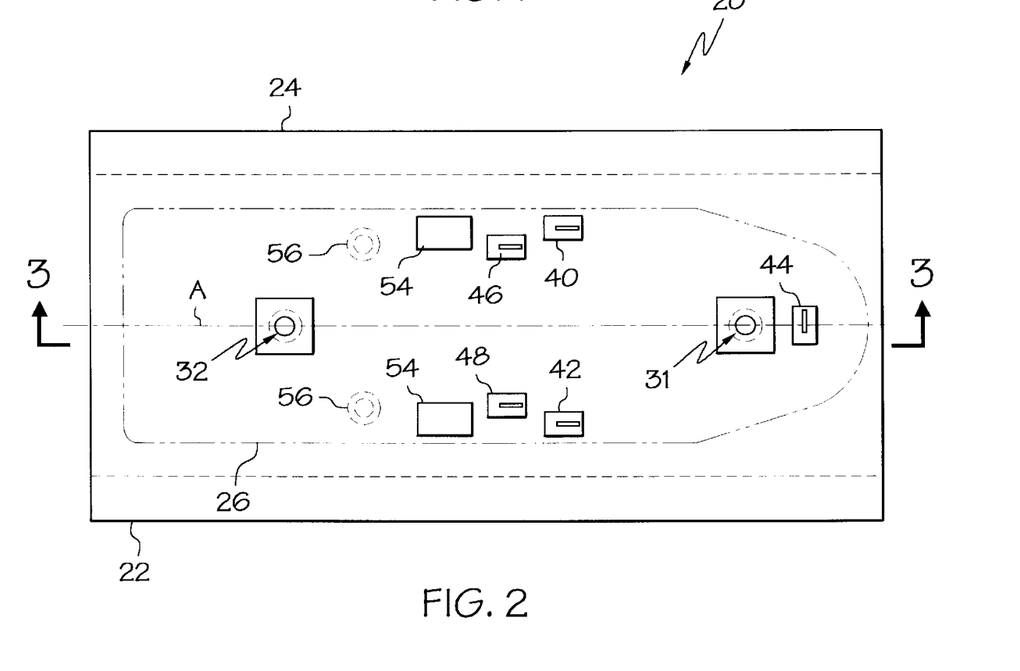
FIG. 2 is a top plan view of the mounting plate and base portion of the invention of FIG. 1.

As shown in FIGS. 1 and 2, the riding board controller 20 generally comprises a base 22 having a mounting plate 24, and a platform 26 adapted to support an operator or player standing thereupon. Preferably, the platform 26 is the size and shape of a skateboard. A pass-through control port 28, mounted on the base 22, connected to the control cable 29 of the controller 18, receives control signals from the conventional hand-held controller. The combination of control signals from the riding board controller 20 and the hand-held controller 18 are sent serially to the host computer 14 through control cable 30 to connector 16.

As shown in FIG. 2, the platform 26 is pivotally supported on the mounting plate 24 by a fulcrum and biasing system comprising front and rear pivot supports 31, 32, respectively. The pivot supports 31, 32 are mounted on the mounting plate 24 substantially along a longitudinal axis A of the platform 26. The pivot supports 31, 32 allow for pivoting of the platform 26 with about a central longitudinal axis A of the platform 26, yet bias the platform 26 away from the mounting plate 24 and bias the platform in a generally flat planar orientation with respect to the mounting plate 24.

Pivot sensors in the form of a pair of outer switches 40, 42 and inner switches 46, 48 are attached to the mounting plate 24 and are positioned thereon such that switches 40, 46 are on one side of axis A and switches 42, 48 are positioned on the other side. Switches 40, 42 are spaced further from axis A than switches 46, 48. As will be explained in greater detail below, outer switches 40 and 42 are positioned to detect slight pivoting of the platform 26 about axis A, while inner switches 46 and 48 are positioned to detect pivoting of the platform to a greater degree.

Switch 44 is positioned substantially on axis A adjacent to the front pivot support 31. Switch 44 is positioned to detect pitching of the front portion 50 (see FIG. 3) of the platform 26, resulting from pivoting of the platform about rear pivot support 32.

Switches 40, 42, 46 and 48 are preferably positioned on the mounting plate 24 past the midpoint of the platform 26 near the rear pivot support 32 to minimize interference with the upward and downward pitching of the front portion 50. It is within the scope of the invention to include additional switches on the mounting plate 24 to detect additional changes in the spatial orientation of the platform 26. For example, an additional switch (not shown) may be placed substantially along the longitudinal axis A adjacent to the rear pivot support 32 to detect downward pitching of the rear portion 52 (see FIG. 3) of the platform 26. Furthermore, although pressure sensitive switches are the preferred sensor in this embodiment, it is within the scope of the invention to use any sufficient alternative sensors, such as contact sensitive switches or optical sensors, to detect changes in the spatial orientation of the platform 26.

Pivot stop 54 and a biasing spring 56 pairs are mounted on the mounting plate 24 and positioned on either side of the axis A. The stops 54 limit the pivotal movement of the platform 26, and the biasing springs 56 provide a predetermined resistance to platform pivotal movement and return the platform 26 to a position substantially parallel to the mounting plate 24 when pivoting pressure to the platform is removed. Therefore, the platform 26 is mounted on the base 22 to allow a certain amount of freedom of movement which is enough to give the operator the tactical feedback required to effectively play the game, yet not so much freedom of motion to make the riding board game controller 20 difficult or awkward to control.

Figure 3:
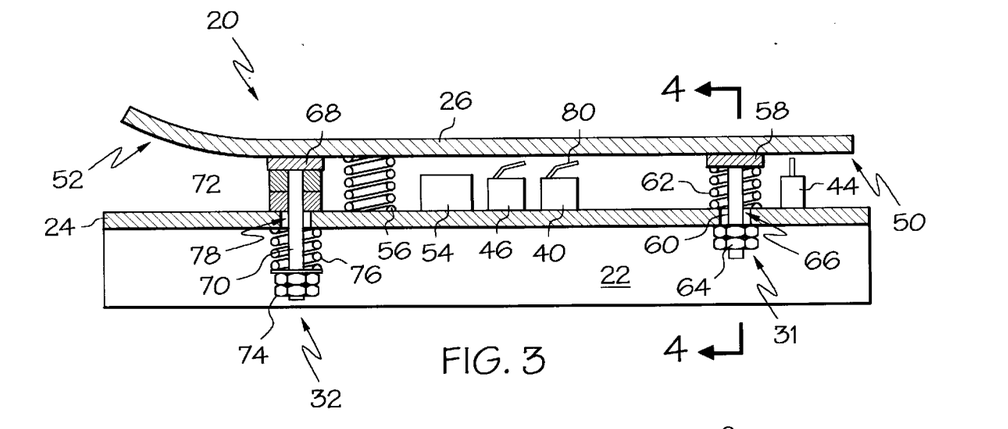
FIG. 3 is a cross sectional view of the invention taken along lines 3—3 of FIG. 2.

As shown in FIG. 3, the front pivot support 31 is configured to allow radial pivoting of the platform 26 with respect to the axis A; and also to allow for upward and downward pitching of the front portion 50 of the platform 26 with respect to the mounting plate 24. The front pivot support 31 comprises a seat 58 attached screwed to the platform 26 and positioned substantially along axis A, a threaded front support bolt 60 having a hex head captured in the seat 58 and a shank extending through the mounting plate 24. A coil compression spring 62 is positioned adjacent to the front support bolt 60 and extends between the seat 58 and the mounting plate 24, and a stop nut 64, mounted on the end of the shank of the front support bolt 60, is positioned beneath the mounting plate 24 to secure the front pivot support 31 to the mounting plate 24. The nut 64 preferably is a lock nut or a prevailing torque nut. A hole 66 is formed in the mounting plate 24 and allows the front support bolt 60 to pass through the mounting plate 24. The hole 66 has a diameter substantially larger than the front support bolt 60, but smaller than the diameter of the stop nut 64, to facilitate the pivoting and vertical pitching of the front pivot support 31 with respect to the mounting plate 24, while the front support and front bolt 60 remain fixed relative to the platform 26 and attached to the mounting plate 24 by stop nut 64.

Front support bolt 60 preferably extends through the coil spring 62. Spring 62 causes the front portion 50 of the is platform to be elevated slightly, to the extent allowed by the length of the front support bolt 60 and the position of the stop nut 64. The spring 62 allows a player (not shown) standing upon the platform 26 to control downward pitching of the front portion 50 by leaning forward against the force of the spring 62. The spring 62 also causes the front portion 50 to return to the initial elevation when the player takes his or her weight off the platform 26 or leans toward the rear portion 52 of the platform.

The rear pivot support 32 comprises a seat 68 screwed to the platform 26 substantially along the axis A, a threaded rear support bolt 70 having a hex head captured in the seat 68 and a shank extending through rubber bushings 72 and the mounting plate 24, a stop nut 74 mounted on the end of the rear support bolt 70, and a coil compression spring 76 positioned adjacent to the rear support bolt 70 and extending between the mounting plate 24 and the stop nut 74. The bushings 72 extend between the seat 68 and the mounting plate 24 and are adapted to bear a substantial portion of the weight of the player. The stop nut 74 (which can be a lock nut or prevailing torque nut) secures the rear pivot support 32 within the mounting plate 24.

A hole 78 in the mounting plate 24 allows the rear support bolt 70 to pass through the mounting plate 24 and has a larger diameter than the rear support bolt 70, but smaller than the spring 76, and the stop nut 74. The diameter of the hole 78 thus facilitates the pivoting of the rear pivot support 32 with respect to the mounting plate 24, while the rear pivot support remains secured to the mounting plate 24 by stop nut 74.

Rear support bolt 70 preferably extends through a coil compression spring 76, which ensures that the rear pivot support 32 has freedom to move, but, in combination with bushings 72 (as well as front pivot support 30 and biasing springs 56) tends to return the platform 26 to an upright position substantially parallel with the mounting plate 24 when no one stands on the platform.

The rear pivot support 32 is configured to allow radial pivoting of the platform 26 with respect to the longitudinal axis A, while bearing a majority of the player's weight. Having the rear pivot support 32 bear the majority of the player's weight is consistent with the way conventional skate boards, snow boards and surf boards are usually ridden.

Figures 4, 5, 6:
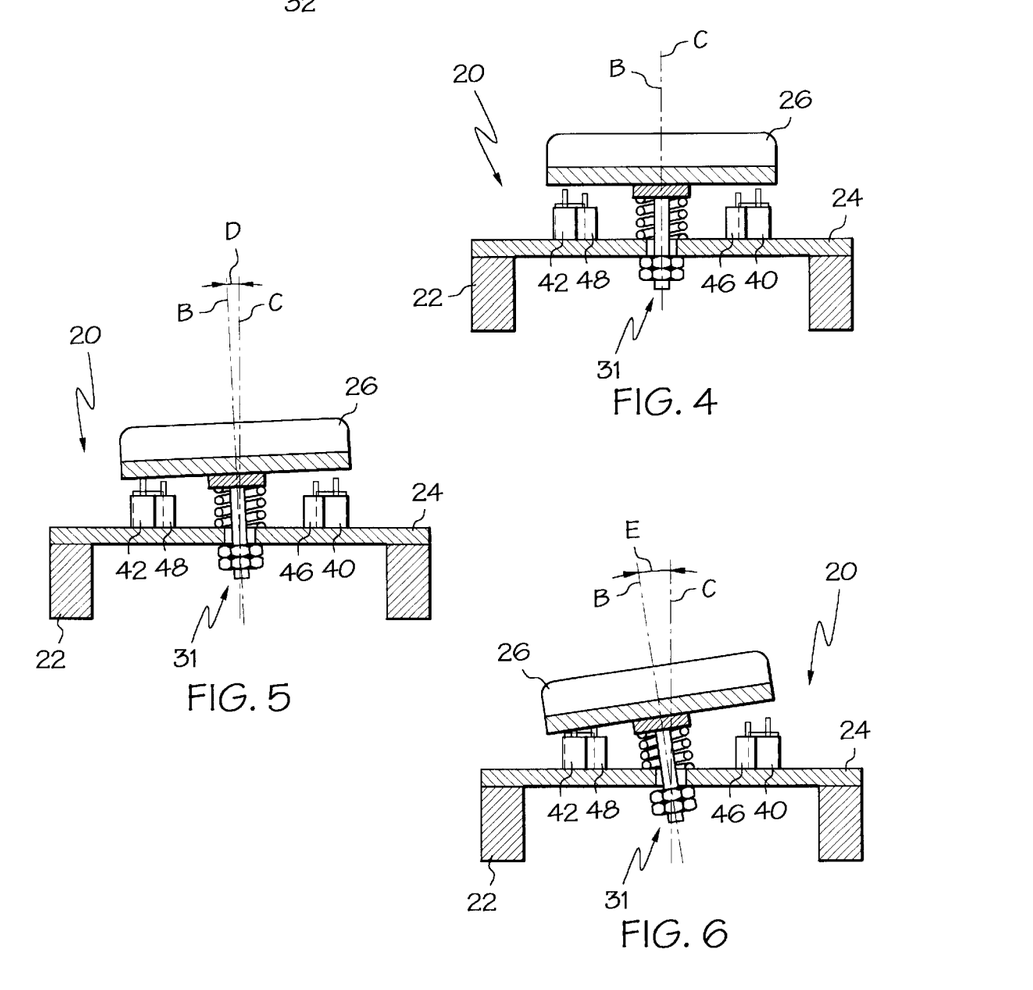
FIG. 4 is a cross sectional view of the invention taken along lines 4—4 of FIG. 3.
FIG. 5 is the cross sectional view of FIG. 4, but showing the first embodiment of the riding board pivoting at an angle relative to the mounting plate.
FIG. 6 is the cross sectional view of FIG. 4, but showing the first embodiment of the riding board pivoting at a greater angle relative to the mounting plate.

As can be seen in FIG. 3, the switches 40–48 have actuating levers 80 biased upwardly with internal springs (not shown) to keep the levers elevated and the switch contacts open. When the platform 26 is pivoted, as shown in FIG. 5, the platform applies pressure to switch lever 80 of switch 42, which in turn closes the contacts of that switch. It is also possible to provide two sets of contacts for each switch such that one set of contacts is active when the lever is up and the other set of contacts is active when the lever is down. Therefore, the two sets of contacts will be mutually exclusive, such that it would be impossible to have continuity in both sets of contacts at one time.

As shown in FIG. 4, when the player is not shifting his or her weight to either of the left or right side of the platform 26 and axis A, no angle exists between a front pivot support centerline B and a vertical axis C. As shown in FIG. 5, when the player shifts his or her weight slightly to the right, the platform 26 pivots from the vertical axis C at a slight angle D. At this angle D, the platform 26 forces the lever 80 of switch 42 to close the connection between the contacts of switch 42, thus activating the switch. A slight weight shift of the same magnitude to the opposite direction will correspondingly cause the platform 26 to pivot in an opposite direction relative to axis A (see FIG. 2) to activate switch 40. Preferably, the is pivot angle D is approximately 7°.

As shown in FIG. 6, when the player shifts his or her weight substantially to the right, the platform 26 pivots from the vertical axis C at a greater angle E. At angle E, the platform 26 contacts lever 80 to close switch 48. A substantial weight shift of the same magnitude in the opposite direction will correspondingly cause the platform 26 to close switch 46. Preferably the angle E is approximately 15°.

Figure 7:
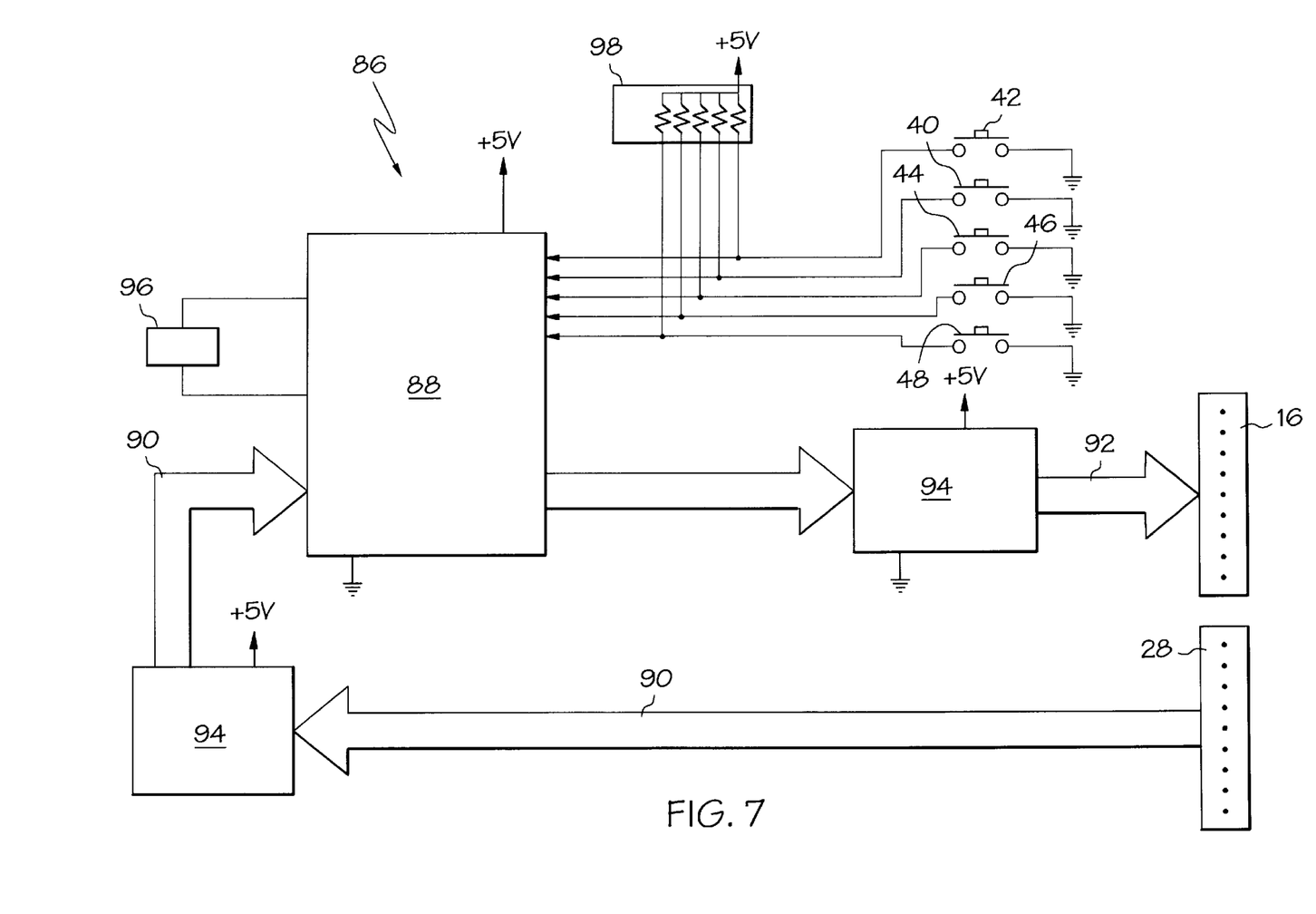
FIG. 7 is a schematic of the interface circuit of the embodiment of FIG. 1.

As shown in FIG. 7, the interface circuit 86 interconnects the switches 40–48 with control port 16 of the host computer 14 and preferably is located within the base 22 (see FIGS. 4–6). The interface circuit 86 typically includes a micro-controller or micro-processor 88 which is connected to read the status of the switches 40 48 and receive pass-through control signals 90 from the hand-held controller pad 18 via pass-through control port 28. The micro-controller 88 processes the switch status and pass-through signals collectively to generate control signals 92, and then transmits the control signals 92 to the host computer control port 16. Communication buffers 94 monitor and control communication between micro-processor 88 and the control ports 16 or pass-through control ports 28. Clock circuit 96 controls the timing of the interface circuit 86. Pull-up resistors 98 condition the switch signals to the micro-controller 88.

A power supply (not shown) is required to power the interface circuit 86. The power supply may be a battery located in the base 2 or simply a current received over cable 30 from the host computer 14. Conventional video game systems often require the respective game controllers to have interface circuits especially adapted to communicate with the host computers of the systems. These interface circuits are widely known in the art and any of them can be incorporated into the riding board controller 20 as interface circuit 86. Furthermore, pass-through circuits are also widely known in the art and are therefore also easily incorporated into interface circuit 86. Therefore, it is within the scope of the invention to use any suitable signal processor means to read the switch-or sensor signals and convert them, along with any pass-through signals, into the required game control signals. Furthermore, the entire interface circuit 86 could conceivably be imprinted onto one integrated circuit chip.

It is preferred that the "jump" command sent by the riding board controller 20 be separated from the "accelerate" command and also be a short one-shot or pulse signal. Therefore, micro-controller 88 is programmed to provide such a signal when switch 44 is deactivated. Alternatively, if the interface circuit 86 does not have a programmable controller 88, a one-shot circuit may be constructed.

Figure 8:
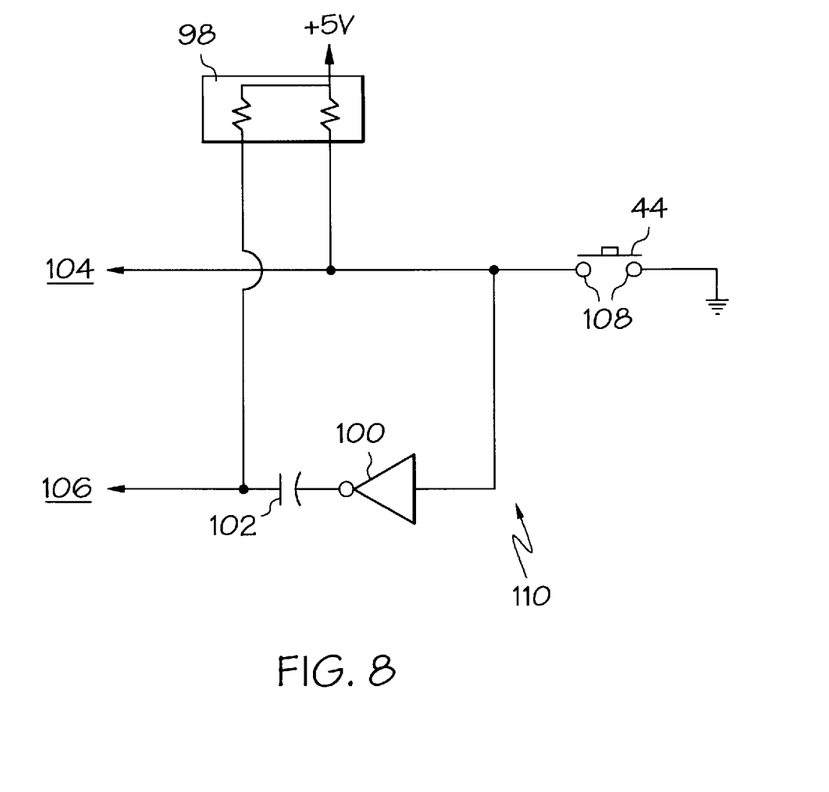
FIG. 8 is a schematic of a "one-shot" circuit of an alternate embodiment of the invention.

As shown in FIG. 8, a simple one-shot circuit 110 breaks switch 44 into two switch signals: an "accelerate" signal 104, which reads "low" when switch 44 is activated, and reads "high" when deactivated; and a "jump" signal 106, which reads "low" for a short time when switch 44 is first deactivated, and reads "high" both when switch 44 is activated and after the short "low" pulse.

The one-shot circuit 110 operates as follows. As the contacts 108 of switch 44 open, a rising signal is generated at the input of NOT gate 100. This generates a corresponding "low" signal on the output of gate 100, causing capacitor 102 to begin recharge. As a result, the "jump" signal 106 reads "low" as capacitor 102 is fully recharging. When capacitor 102 is recharged, signal 106 reads "high" even though the output of gate 100 remains "low" indefinitely. when switch 44 is closed again, the process starts over.

In operation, the riding board controller 20 is first connected to the control port 16 of the video game system 10. A software video-game program based on a skateboarding, snowboarding, or surfboarding theme is operating in the host computer 14, which in turn is displaying the game's audio-visual signals on monitor 12. A player standing on the riding board controller 20 controls the video game action in the following manner. When the player leans slightly to the left, thus pivoting the platform to activate only switch 40, causes the riding board controller 20 to send a "left-turn" directional signal to the video game. When the player leaning substantially to the left, pivoting the platform to activate both switches 40 and 46, causes the riding board controller to send a "left-turn" directional signal in combination with a "sharp-turn" non-directional signal to the video game. When the player leans slightly to the right, pivoting the platform to activate switch 42 (and in turn deactivating switches 40 and 46) causes the riding board controller to send a "right-turn" directional signal to the video game. When the player leans substantially to the right, the pivoting platform activates switches 42 and 48, which cause the riding board controller to send a "right-turn" directional signal in combination with a "sharp-turn" non-directional signal to the video game.

When the player leans forward, the platform pitches downwardly to activate switch 44 and cause the riding board controller to send an "accelerate" non-directional signal to the video game. When the player leans backwards, the platform pitches upwardly to deactivate switch 44 thus causing the riding board controller to send a one-shot "jump" signal to the video game. Furthermore, the player may be simultaneously holding a hand-held controller 18 inserted into the pass-through port 28, and could thus command the video game to perform a multitude of functions by hand such as ducking or throwing elbows, or could start the game or scroll through a menu to select a game.

Figure 9:
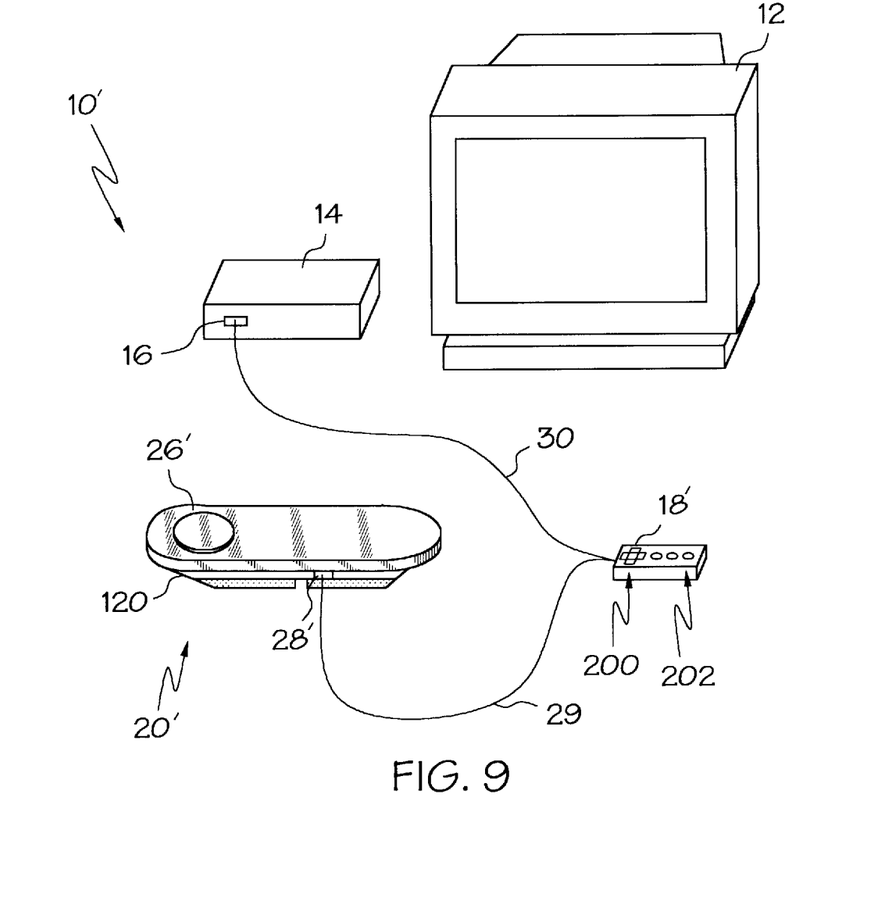
FIG. 9 is a perspective view of a second embodiment of the present invention, shown connected to a conventional video game system.
Figure 10:
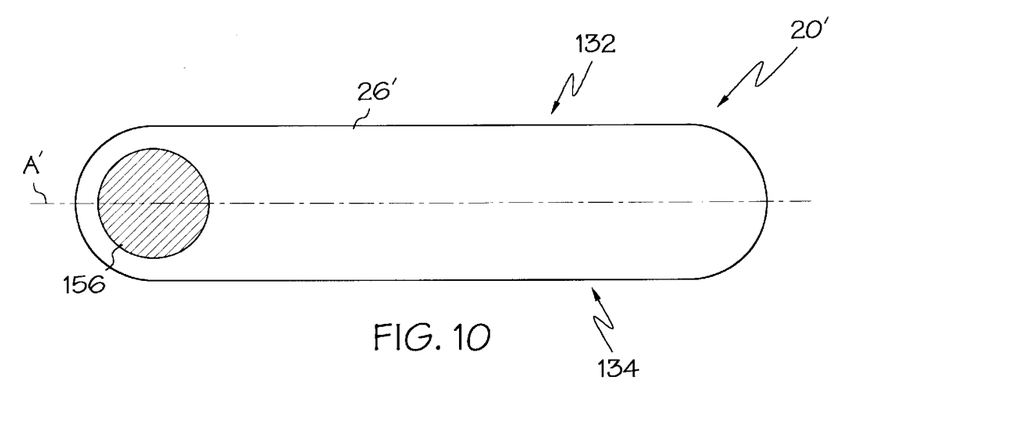
FIG. 10 is a top plan view of the controller of FIG. 9.

As shown in FIG. 9, a second embodiment of the riding board game controller of the present invention, generally designated 20', is shown connected to a conventional video game system 10' that includes a monitor 12 and a host computer 14. The host computer 14 generates audio-visual signals and transmits them to the monitor 12. The host computer 14 has a receptacle on a control port 16 for receiving control signals from a conventional hand-held game controller 18' and the riding board controller 20'. The riding board controller 20', is connected to the host computer 14 via the hand-held controller 18'. The hand-held game controller includes dual-state directional switches 200 and dual-state non-directional switches 202.

As shown in FIGS. 9–12, the riding board controller 20' generally comprises a platform 26' having a left side 132 and a right side 134; adapted to support an operator or player standing thereupon. Preferably, the platform 26 is the size and shape of a skateboard. A chassis 120, for housing the internal electronics of the riding board controller is mounted to the bottom surface of the platform 26'. A control port 28', mounted on the chassis 120, connected to the control cable 29, sends dual-state switch signals to the hand-held controller. The combination of control signals from the riding board controller 20' and the hand-held controller 18' are sent serially to the host computer 14, through control cable 30, to connector 16.

Figure 12:
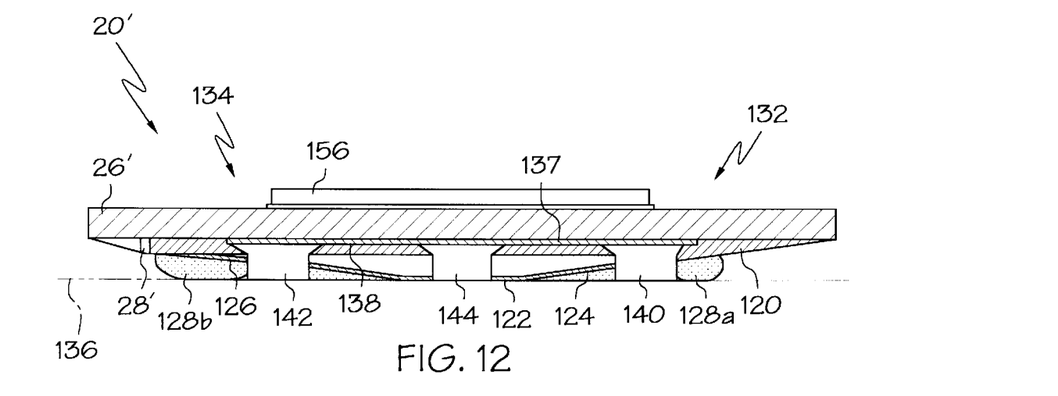
FIG. 12 is a cross-sectional, elevational view taken along lines 12—12 of FIG. 11.

The chassis 120 includes a bottom surface having a flat and lower-most longitudinal center portion 122; an angled or beveled left surface portion 124, angled upwardly from the flat center portion 122; and an angled or beveled right surface portion 126, angled upwardly from the flat center portion 122. The bottom surface of the chassis 122, 124, 126 thus forms a fulcrum about which the platform 26' can pivot when stood upon by the operator. The pivoting of the platform 26' about the fulcrum formed by the bottom surfaces of the chassis will be discussed in greater detail below.

Figure 11:
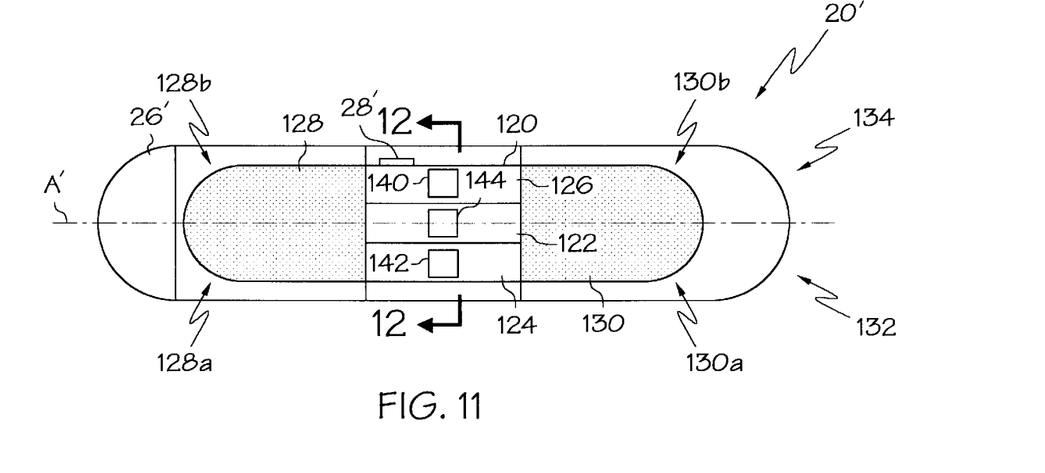
FIG. 11 is a bottom plan view of the controller of FIGS. 9 and 10.

A biasing system comprises a rear resilient foam pad 128 and a forward resilient foam pad 130. Each of the pads 128, 130 have portions 128a, 128b, 130a, 130b, positioned on the left side 132 and the right side 134 of the axis A', respectively (each portion representing an individual biasing element), that are sufficiently thick (i.e., having a thickness such that the pads can extend beyond the flat bottom surface 122 of the chassis when the pads are not compressed) and sufficiently resilient so as to lift the flat center portion 122 of the chassis bottom surface above the floor 136 (playing surface), when no weight is being applied to the top surface of the platform 26'; yet they are sufficiently flexible to allow a player, standing upon the platform 26', to shift his or her weight such that the platform 26' will pivot significantly upon the fulcrum formed by the chassis 120 left or right, depending upon the amount of weight shifted to the particular side. The resiliency of the foam pads will also allow the platform to flatten itself with respect to the playing surface when no weight is being applied to the top surface of the platform.

A circuit board 137, to which electronic circuitry is mounted (see FIG. 17), is mounted within the chassis 120. Also mounted to the top surface 138 of the circuit board are three silicone switches: a left switch 140 extending through the left bottom surface portion 124 of the chassis, a right switch 142 extending through the right bottom surface portion 126 of the chassis, and a central switch 144 extending through the center bottom surface portion 122 of the chassis.

Figure 13:
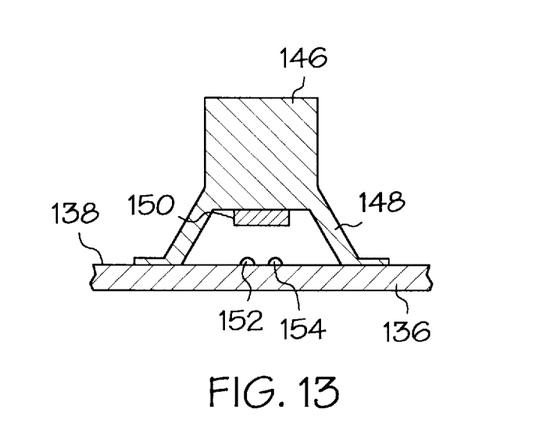
FIG. 13 an cross-sectional, elevational view of a switch and circuit board for use with the invention.

As shown in FIG. 13, each of the silicone switches include a rubber button 146, supported above the circuit board 137 by collapsible rubber support web 148. Mounted to the bottom surface of the rubber button is a carbon pill 150. The rubber support web acts to keep the carbon pill 150 elevated with respect to the circuit board until sufficient weight is applied to the top of the rubber button, causing the rubber support web to collapse. A pair of conductive traces 152, 154 coupled to the signal processing circuit, are etched into the top side 138 of the circuit board, directly below the carbon pill 150. When the carbon pill contacts the conductive traces 152, 154, the conductivity of the carbon pill will short the two traces together, activating the particular switch on the circuit board.

Figure 14:
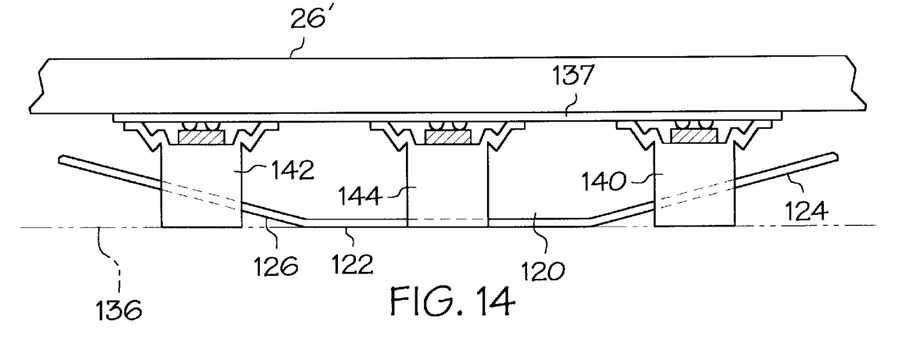
FIG. 14 is a schematic, cross-sectional representation of the riding board controller having a weight applied from above, but not pivoting at any angle.
Figure 15:
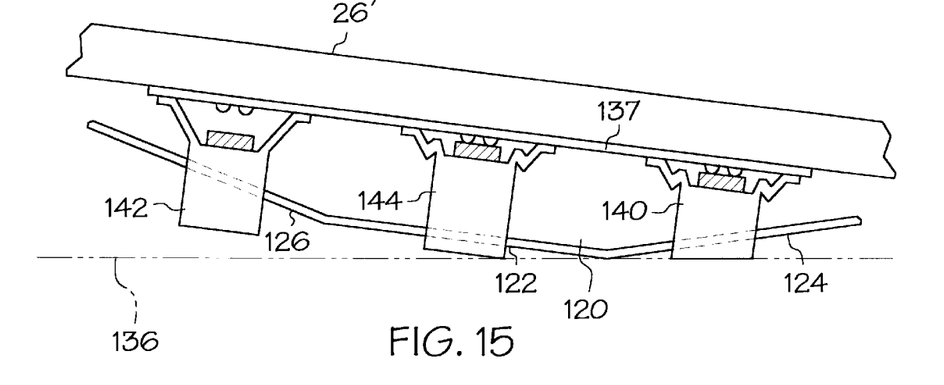
FIG. 15 is a schematic, cross-sectional representation of the riding board controller of FIG. 14 pivoting slightly to the left.
Figure 16:
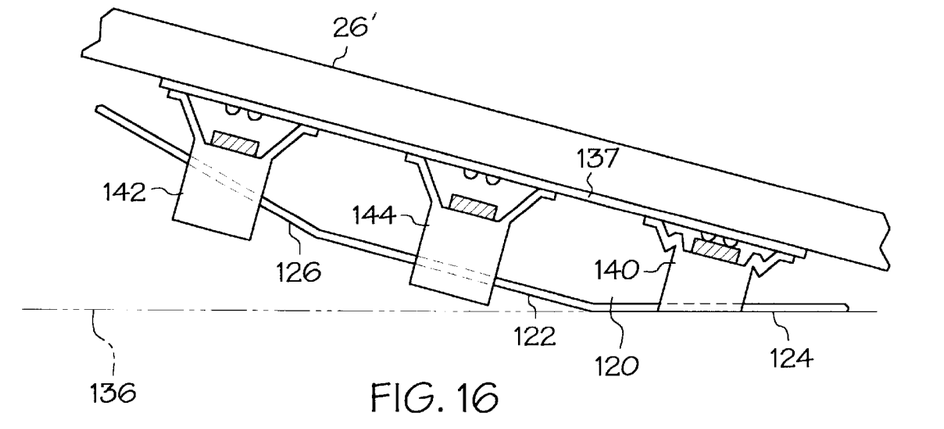
FIG. 16 is a schematic, cross-sectional representation of the riding board controller of FIG. 14 pivoting substantially to the left.

The left, right and central switches 140, 142, and 144 are mounted such that their rubber buttons extend below their respective chassis bottom surface portions 124, 126, 122 when the switches are not collapsed. Thus when weight is applied to the top of the platform 26', substantially evenly centered with respect to the longitudinal axis A', as shown in FIG. 14, all three switches will collapse and activate. As shown in FIG. 15, when the operator shifts his or her weight slightly to the left, the platform will pivot on the chassis 120 to the left and will cause the right switch 142 to recover and deactivate. As shown in FIG. 16, when the operator shifts his or her weight significantly to the left, the platform will pivot on the chassis 120 substantially to the left to allow the central switch 144 to recover enough such as to allow the central switch to deactivate.

Likewise, if the operator shifts only slightly to the right, both the right and central switches 142, 144 will be activated; and if the operator shifts significantly to the right, only the right switch 142 will be activated.

It will be apparent to those of ordinary skill in the art that it is within the scope of the invention to incorporate any type of fulcrum system mounted to the bottom of the riding board controller 20', adapted to abut the floor 136 when the operator stands upon the platform 26', and adapted to allow the operator to pivot the platform with respect to the axis A'. For example, a fulcrum bar can be attached along the axis A' or the bottom surface of the chassis can be curved, etc.

Referring again to FIGS. 10 and 12, the controller 20' may also include a foot pedal 156, operatively connected to a dual-state switch 158 (see FIG. 17 described below). The foot pedal, which is preferably pressure activated, may be used as an "accelerator," for example.

Figure 17:
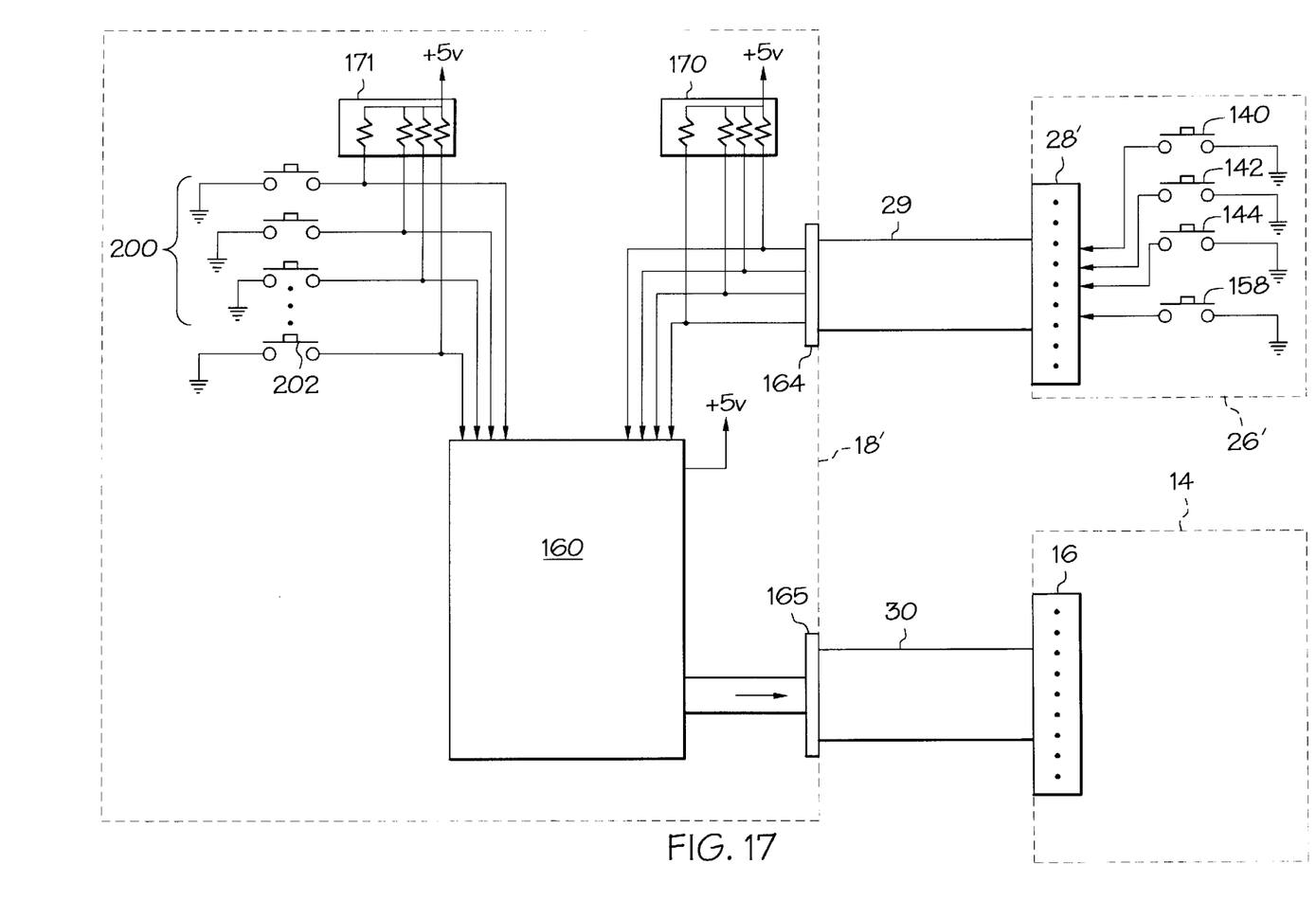
FIG. 17 is a schematic of the interface circuitry of the embodiment of FIG. 9.

As shown in FIG. 17, the hand-manipulated controller 18' includes signal processing circuitry 160, which is generally used to transmit directional and non-directional control signals to the host computer 14, via port 16, based upon the states of the dual-state switches 140, 142, 144, 158 on the riding board controller 20' and the dual-state switches 200, 202 on the hand-manipulated controller 18'. The hand-manipulated controller 18' includes a connector 164 for coupling to the control cable 29, and a connector 165 for coupling to the control cable 30. Pull-up resistors 170, 171 condition the switch signals to the processing circuit. A power supply (not shown) is required to power the signal processing circuitry 160. The power supply may be a battery located in the hand-manipulated controller 18' or simply a current received over control cable 30 from the host computer 14.

Figure 18:
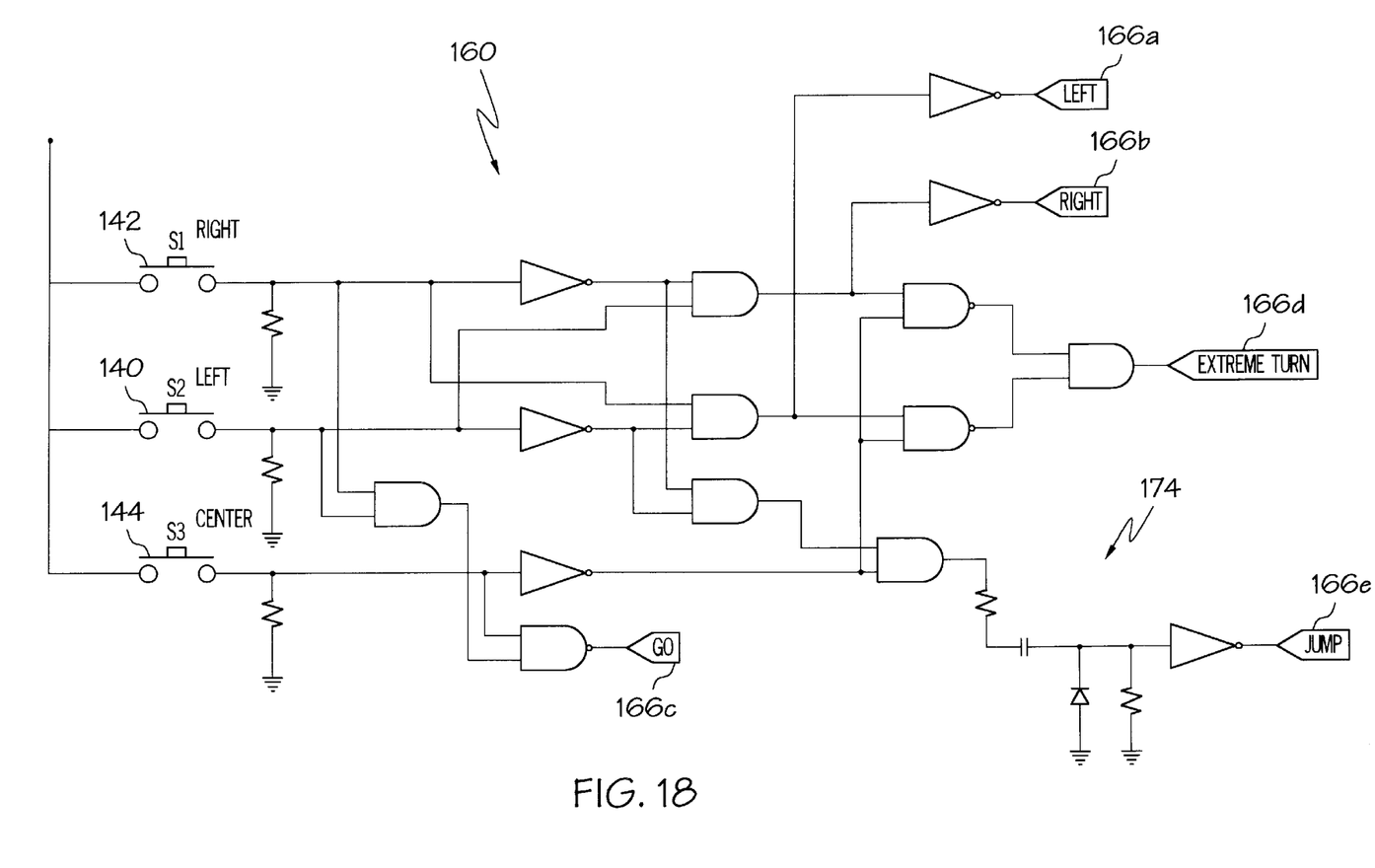
FIG. 18 is a logic diagram of signal processing circuitry for use with the embodiment of FIG. 9.

As shown in FIG. 18, an example logic diagram for the signal processing circuitry 160 is provided that converts the states (signals) of the left, right, and center switches 140, 142, and 144 into directional control signals 166a ("LEFT"), 166b ("RIGHT"), and 166c ("GO") and into non-directional signals 166d ("EXTREME TURN") and 166e ("JUMP"). A one-shot circuit 174 can be used with the JUMP signal 166e. It will be apparent to one of ordinary skill in the art that it is within the scope of the present invention that any type of signal processing circuitry, including microprocessor circuits, be used as the signal processing circuitry 160.

In operation, the riding board controller 20' is first connected to the control port 16 of the video game system 10'. A software video-game program based on a skateboarding, snowboarding, or surfboarding theme is operating in the host computer 14, which in turn is displaying the game's audio-visual signals on monitor 12. A player standing on the riding board controller 20' controls the video game action in the following manner. When the player leans slightly to the left, thus pivoting the platform to activating switches 140 and 144, causes the riding board controller 20' to send only a "LEFT" directional signal 166a to the video game. When the player leaning substantially to the left, pivoting the platform to deactivate switch 144, causes the riding board controller to send a "LEFT" directional signal 166a in combination with an "EXTREME TURN" 166d nondirectional signal to the video game. When the player leans slightly to the right, pivoting the platform to activate only switches 142 and 144, causes the riding board controller to send only a "RIGHT" directional signal 166b to the video game.

When the player leans substantially to the right, the pivoting platform deactivates switch 144, which cause the riding board controller to send a "RIGHT" directional signal 166b in combination with an "EXTREME TURN" nondirectional signal 166d to the video game.

When the player jumps from the platform, the biasing system of the platform causes all the switches to deactivate, causing the riding board controller to send a one-shot "JUMP" signal 166e to the video game. Furthermore, the player may be simultaneously holding the hand-held controller 18', and could thus command the video game to perform a multitude of functions by hand such as ducking or throwing elbows, or could start the game or scroll through a menu to select a game.

Having described the invention in detail and by reference to the drawings, it will be apparent that modification and variations are possible without departing from the scope of the invention as defined in the following claims.

What is claimed is:

1. A riding board game controller for sending directional and non-directional control signals to an audiovisual game having an audio-visual display device, a microprocessor-based host computer for sending audio-visual signals to said display device, and a software program for operating on said host computer to generate said audio-visual signals in response to said control signals, the riding board game controller comprising:

a platform having a longitudinal axis supported for pivotal movement along said longitudinal axis above a playing surface and for supporting an operator standing on said platform, such that side-to-side pivoting of said platform is effected by an operator shifting his or her weight side-to-side while standing on said platform;

a resilient support positioned between said platform and said playing surface for urging said platform to maintain a substantially horizontal configuration;

a first dual-state switch, for generating a first dual-state signal, said first switch being positioned beneath said platform on a side of said longitudinal axis to be actuated by pivoting of said platform to said side;

a second dual-state switch for generating a second dual-state signal, said second switch being positioned beneath said platform on an opposite side of said longitudinal axis, said second switch being actuated by pivoting of said platform to said opposite side;

a third dual-state switch for generating a third dual-state signal, said third switch being positioned beneath said platform, surface, substantially near said longitudinal axis, said third switch being actuated by movement of said longitudinal axis towards or away from said playing surface; and a signal processor for converting said first and second dual-state signals into directional control signals and said third dual-state signal into a non-directional signal, and for sending said directional and non-directional control signals to said host computer.

2. The controller of claim 1 further comprising means for combining said directional and non-directional signals with additional control signals from a hand-held controller and for transferring said directional, non-directional and additional control signals to said host computer.

3. The controller of claim 1 wherein:

a bottom surface of said platform is shaped to act as a fulcrum aligned with said longitudinal axis, said bottom surface being positioned to abut said playing surface when force is applied to said platform sufficient to overcome said resilient support, such that said platform will pivot side-to-side about said bottom surface when a player stands upon said platform and shifts his weight; and said resilient support includes a pair of biasing elements, mounted on said bottom surface on opposite sides of said longitudinal axis, said element being adapted to urge said platform to be parallel with respect to said playing surface and urge said platform away from said playing surface such that said fulcrum is separated from said playing surface when no force is applied to said platform.

4. The controller of claim 3 wherein said biasing elements include a resilient foam pad.

5. The controller of claim 1 wherein said switches are mounted on a bottom surface of said platform.

6. The controller of claim 5 further comprising a circuit board mounted on said bottom surface of said platform, wherein said switches are mounted on said circuit board.

7. The controller of claim 6 wherein said first, second and third switches comprise silicone rubber button switches.

8. The controller of claim 6 wherein:

said bottom surface is shaped to act as a fulcrum aligned with said longitudinal axis, said bottom surface being positioned to abut said playing surface when a force is applied to said platform sufficient to overcome said resilient support, such that said platform will pivot side-to-side about said fulcrum when a player stands upon said platform and shifts his weight; and said resilient support includes a pair of biasing elements, mounted on said bottom surface on opposite sides of said longitudinal axis, said elements urge said platform to be parallel with respect to said playing surface and urge said platform away from said playing surface such that said fulcrum is separated from said playing surface when no force is applied to said platform.

9. The controller of claim 8 further comprising a dual-state pressure switch having a foot pedal for generating a fourth dual-state signal, said pressure switch being positioned on a top surface of said platform to be activated by positive pressure being applied to said foot pedal, wherein said signal processor converts said fourth dual-state signal into a non-directional control signal.

10. The controller of claim 1, wherein:

said platform is pivotally mounted to said playing surface;

said playing surface is a top surface of a base;

said first, second and third switches are mounted to said top surface of said base; and said signal processor is mounted within said base.

11. A riding board game controller for sending directional and non-directional control signals to an audiovisual game having an audio-visual display device, a microprocessor-based host computer for sending audio-visual signals to said display device, and a software program for operating on said host computer to generate said audio-visual signals in response to said control signals, the riding board game controller comprising:

a platform having a longitudinal axis supported for pivotal movement along said longitudinal axis on a playing surface and for supporting an operator standing on said platform, such that side-to-side pivoting of said platform is effected by an operator shifting his or her weight side-to-side while standing on said platform;

a resilient support positioned between said platform and said playing surface for urging said platform to maintain a substantially parallel orientation to said playing surface;

a first dual-state switch for generating a first dual-state signal, said first switch being positioned between said platform and said playing surface, on a side of said longitudinal axis to be actuated by pivoting of said platform to said first side at a first angle with respect to said playing surface;

a second dual-state switch for generating a second dual-state signal, said second switch being positioned between said platform and said playing surface on an opposite side of said longitudinal axis, said second switch being actuated by pivoting of said platform to said opposite side at said first angle with respect to said playing surface;

a third dual-state switch for generating a third dual-state signal, said third switch being positioned between said platform and said playing surface, said third switch being actuated by pivoting said platform at a second angle with respect to said playing surface, said second angle being larger than said first angle; and a signal processor for converting said first and second dual-state signals into directional control signals, for converting said third dual-state signal into a non-directional signal, and for sending said directional and non-directional control signals to said host computer.

12. The controller of claim 11, further comprising means for combining said directional and non-directional signals with additional control signals from a hand-held controller and for transferring said directional, non-directional and additional control signals to said host computer.

* * * * *